(12) United States Patent
Mecier et al.

(10) Patent No.: US 6,285,243 B1
(45) Date of Patent: Sep. 4, 2001

(54) HIGH-VOLTAGE CHARGE PUMP CIRCUIT

(75) Inventors: Richard A. Mecier; Todd A. Merritt, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/511,577

(22) Filed: Feb. 23, 2000

(51) Int. Cl.$^7$ ............................................ G05F 1/10
(52) U.S. Cl. ......................................................... 327/536
(58) Field of Search ................................ 327/530, 534, 327/535, 536

(56) References Cited

U.S. PATENT DOCUMENTS

| | | | |
|---|---|---|---|
| 5,023,465 | 6/1991 | Douglas et al. | 365/203 |
| 5,038,325 | 8/1991 | Douglas et al. | 365/189.06 |
| 5,039,877 | 8/1991 | Chern | 307/296.2 |
| 5,126,590 | 6/1992 | Chern | 307/296.2 |
| 5,128,560 | 7/1992 | Chern et al. | 307/475 |
| 5,172,013 * | 12/1992 | Matsumura | 307/296.2 |
| 5,182,529 | 1/1993 | Chern | 331/57 |
| 5,212,442 | 5/1993 | O'Toole et al. | 324/158 R |
| 5,245,577 | 9/1993 | Duesman et al. | 365/201 |
| 5,260,646 | 11/1993 | Ong | 323/349 |
| 5,343,088 * | 8/1994 | Jeon | 307/296.2 |
| 5,394,320 | 2/1995 | Blodgett | 363/60 |
| 5,444,362 * | 8/1995 | Chung et al. | 323/313 |
| 5,446,367 | 8/1995 | Pinney | 323/266 |
| 5,493,249 | 2/1996 | Manning | 327/540 |
| 5,519,360 | 5/1996 | Keeth | 331/173 |
| 5,525,926 | 6/1996 | Merritt | 327/535 |
| 5,537,306 | 7/1996 | Blodgett | 363/60 |
| 5,552,739 | 9/1996 | Keeth et al. | 327/538 |
| 5,563,499 | 10/1996 | Pinney | 323/266 |
| 5,574,390 | 11/1996 | Thomann | 326/88 |
| 5,604,693 | 2/1997 | Merritt et al. | 365/96 |
| 5,642,073 | 6/1997 | Manning | 327/536 |
| 5,644,215 | 7/1997 | Casper | 323/274 |
| 5,646,898 | 7/1997 | Manning | 365/205 |
| 5,661,428 | 8/1997 | Li et al. | 323/313 |
| 5,677,645 | 10/1997 | Merritt | 327/536 |
| 5,677,649 | 10/1997 | Martin | 331/57 |
| 5,689,213 | 11/1997 | Sher | 331/57 |
| 5,740,111 | 4/1998 | Duesman | 365/189.09 |
| 5,757,170 | 5/1998 | Pinney | 323/266 |
| 5,790,448 | 8/1998 | Merritt et al. | 365/96 |
| 5,811,990 | 9/1998 | Blodgett et al. | 326/81 |
| 5,818,289 | 10/1998 | Chevallier et al. | 327/536 |
| 5,828,095 | 10/1998 | Merritt | 257/299 |
| 5,831,918 | 11/1998 | Merritt et al. | 365/201 |
| 5,841,714 | 11/1998 | Sher et al. | 365/201 |
| 5,880,593 | 3/1999 | Gilliam | 324/769 |
| 5,905,682 | 5/1999 | Gans et al. | 365/201 |
| 5,930,175 | 7/1999 | Lakhani et al. | 365/185.33 |
| 5,939,935 | 8/1999 | Merritt | 327/536 |
| 5,959,323 | 9/1999 | Gonzalez | 257/299 |
| 5,986,916 | 11/1999 | Meritt et al. | 365/95 |
| 5,991,214 | 11/1999 | Merritt et al. | 365/201 |
| 6,005,812 | 12/1999 | Mullarkey | 365/189.09 |
| 6,023,429 | 2/2000 | Mecier et al. | 365/194 |
| 6,055,193 | 4/2000 | Manning et al. | 365/189.11 |
| 6,057,725 | 5/2000 | Manning | 327/325 |
| 6,078,212 | 6/2000 | Lakhani | 327/536 |
| 6,107,863 * | 8/2000 | Iwata | 327/536 |
| 6,121,822 * | 9/2000 | Merritt | 327/536 |

* cited by examiner

*Primary Examiner*—Jeffrey Zweizig
(74) *Attorney, Agent, or Firm*—Schwegman, Lundberg, Woessner & Kluth, P.A.

(57) ABSTRACT

Charge pump circuits are described that transfer a voltage signal in an output stage without signal-level degradation. Where a voltage signal may cause damage to circuitry or semiconductor breakdown, at least one bypass technique is engaged to inhibit such damage or breakdown.

11 Claims, 7 Drawing Sheets

HIGH-VOLTAGE CHARGE PUMP CIRCUIT

FIELD OF THE INVENTION

The present invention relates generally to semiconductor integrated circuits. More particularly, it pertains to devices and methods to selectively transfer a high-voltage signal in a charge pump circuit.

BACKGROUND OF THE INVENTION

Integrated circuits often require supply voltages of greater potential than that provided by an external voltage source (external supply). Memory circuits such as dynamic random access memories (DRAMs) and video DRAMs require higher internal voltages to pre-charge memory word lines and the like. Flash memories may require high voltages for programming operations, such as erasing. Integrated circuits that are dependent upon a limited external power supply, such as a battery, must generate additional supply voltages using conversion circuitry. Charge pumps have been used as on-chip voltage generators capable of providing a voltage more positive than the most positive external supply or more negative than the most negative external supply.

In certain circumstances, the external supply may already be at a high voltage level already. One such circumstance includes life-cycle testing of an integrated circuit during the manufacturing process. Life-cycle testing includes a high-voltage, high temperature test to eliminate integrated circuits that have an undesired probability of failure within a pre-determined amount of time. In this test, the charge pump may generate from the high-voltage external supply an even higher voltage level than intended. This higher voltage level may cause damage to an integrated circuit, that otherwise may not have the undesired probability of failure, which reduces the yield of saleable integrated circuits during the manufacturing process.

Several techniques have been introduced in an attempt to alleviate the problem, including the use of diode clamps and diode stacks. However, these techniques are engaged after the integrated circuit has built up a potentially damaging level of voltage, making the effectiveness of these techniques questionable. Additionally, these techniques cannot be turned on or off as needed.

Thus, what is needed are devices and methods to selectively control the generation of high voltages in charge pump circuits.

SUMMARY OF THE INVENTION

The above mentioned problems with charge pump circuits and other problems are addressed by the present invention and will be understood by reading and studying the following specification. Devices and methods are described which accord these benefits.

An illustrative embodiment includes a charge pump circuit. The charge pump circuit includes a gating stage to generate a gating signal; the gating stage includes at least one boosting stage to boost the gating signal to a predetermined level of energy. The charge pump circuit further includes an output stage having a first, a second, and a third connection; the first connection of the output stage is receptive to a high-voltage signal; the second connection of the output stage is coupled to the gating stage to receive the gating signal; and the third connection presents the high-voltage signal. The charge pump circuit further includes a bypass stage coupled to the gating stage to selectively act upon the boosting stage so as to allow the output stage to output a desired level of the high-voltage signal.

Another illustrative embodiment includes a charge pump circuit. The charge pump circuit includes a gating stage to generate a gating signal; the gating stage includes at least one boosting stage to boost the gating signal to a predetermined level of energy; the boosting stage includes a delay stage to assist the boosting stage to boost the gating signal to the predetermined level of energy. The charge pump circuit further includes an output stage having a first, a second, and a third connection; the first connection of the output stage is receptive to a high-voltage signal; the second connection of the output stage is coupled to the gating stage to receive the gating signal; and the third connection presents the high-voltage signal. The charge pump circuit further includes a bypass stage coupled to the gating stage to selectively act upon the gating stage so as to bypass the delay stage.

Another illustrative embodiment includes a charge pump circuit. The charge pump circuit includes a phase generator to generate a first and a second phase. The charge pump circuit further includes a gating stage to generate a gating signal; the gating stage includes a first and second boosting stage to boost the gating signal to a predetermined level of energy. The charge pump circuit further includes a high-voltage generator to provide a high-voltage signal; the high-voltage signal includes a first and a second main energy-storing device. The charge pump circuit further includes an output stage coupled to the gating stage; the output stage receives and outputs the high-voltage signal; the output stage includes a first and a second output device. The charge pump circuit further includes a bypass stage coupled to the gating stage to selectively act upon the gating stage so as to allow the output stage to output a desired level of the high-voltage signal; the bypass stage includes a first and a second bypassing circuit.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1:
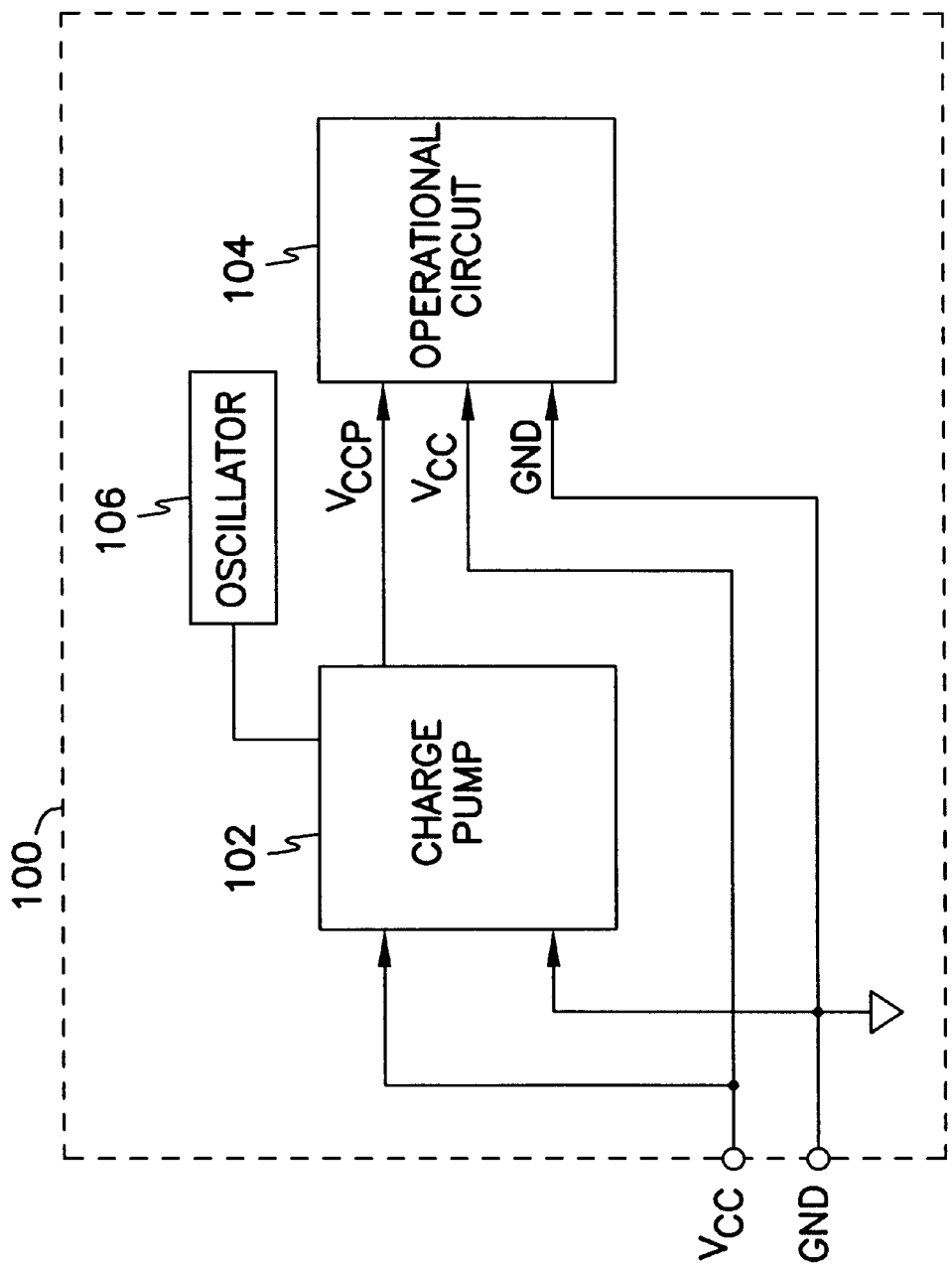
FIG. 1 is a block diagram of a device according to an embodiment of the present invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The transistors described herein include transistors from bipolar-junction technology (BJT), field-effect technology (FET), or complementary metal-oxide-semiconductor (CMOS). A metal-oxide-semiconductor (MOS) transistor includes a gate, a first node (drain) and a second node (source). Since a MOS is typically a symmetrical device, the true designation of "source" and "drain" is only possible once voltage is impressed on the terminals. The designations of source and drain herein should be interpreted, therefore, in the broadest sense.

The terms "high" and "low" as used herein refer to Vcc, the supply voltage, and ground, respectively. The term "external supply" as used herein refers to Vcc, the supply voltage.

The term "energy-storing device" described herein includes any devices capable of storing charges. The term "energy-storing device" includes a capacitor. The capacitor described herein can be any capacitor fabricated on an integrated circuit using any fabrication technique. The energy-storing device described herein, however, may be fabricated as an n-channel transistor; the transistor's source and drain are connected together to form one conductive plate, its gate forms the other conductive plate, and the oxide layer forms the dielectric.

The term "pre-charging device" described herein includes any devices capable of providing charges to maintain a predetermined level of charges in an energy-storing device while a system that includes the energy-storing device is turned off. The reason for pre-charging is thus: the energy-storing device may have to store a large amount of charges to enable a charge pump circuit to provide a high-voltage signal. Without pre-charging, an undesired amount of time may have to be taken once the system is turned on to charge the energy-storing device. The pre-charging device described herein can be a square-law device. The pre-charging device described herein can be any transistor fabricated on an integrated circuit using any fabrication technique. The pre-charging device described herein, however, may be fabricated as an n-channel transistor with its drain and gate connected together; the drain is connected to an external supply.

The term "charging device" described herein includes any devices capable of charging an energy-storing device up to the level of the external supply. The purpose of the charging device is to charge the energy-storing device to compensate for any level degradation that may occur from the pre-charged process. The charging device described herein can be any transistor fabricated on an integrated circuit using any fabrication technique. The charging device described herein, however, may be fabricated as an n-channel transistor. This transistor may be configured with its drain connected to an external supply.

The embodiments of the present invention focus on the problem of controlling the formation of high-voltage signals in a charge pump circuit when the external supply is already at a high voltage level. One such case includes a burn-in test. This test is a specific implementation of a life-cycle testing strategy designed to eliminate from the yield process manufactured integrated circuits that have an undesired probability of failure within a predetermined amount of time in operation.

In the manufacturing process, an integrated circuit is produced as the result of fabrication techniques. Then, the integrated circuit goes through assembly operations. At this point, the integrated circuit is operational. However, there is a probability that the integrated circuit may include defects, such as marginal gate oxide, weak source-drain junction, or both. This probability is a measure of the likelihood that the integrated circuit may fail prematurely during operation in the field. In one embodiment of the application of the burn-in test, the integrated circuit is placed in an oven at about 125 degrees Celsius. The voltages used in the burn-in test vary depending on the thickness of the gate oxide of the integrated circuit. In general, these voltages are at a high voltage level. The charge-pump circuit responsive to such a high voltage level produces even higher voltages. These higher voltages may damage integrated circuits that may not have the undesired probability of premature failure.

The embodiments of the present invention inhibit these higher voltages from being formed in a charge pump circuit when the external supply is already at a high voltage level.

FIG. 1 is a block diagram of a device according to an embodiment of the present invention. The device 100 has a charge pump 102, an oscillator 106, and operational circuit 104. The operational circuit 104 can be any functional circuit; for example, a memory device such as a dynamic random access memory (DRAM) or flash. The charge pump 102 converts Vcc provided by an external power supply into a higher potential Vccp. The operational circuit 104, therefore, has both Vcc and Vccp available.

Figure 2:
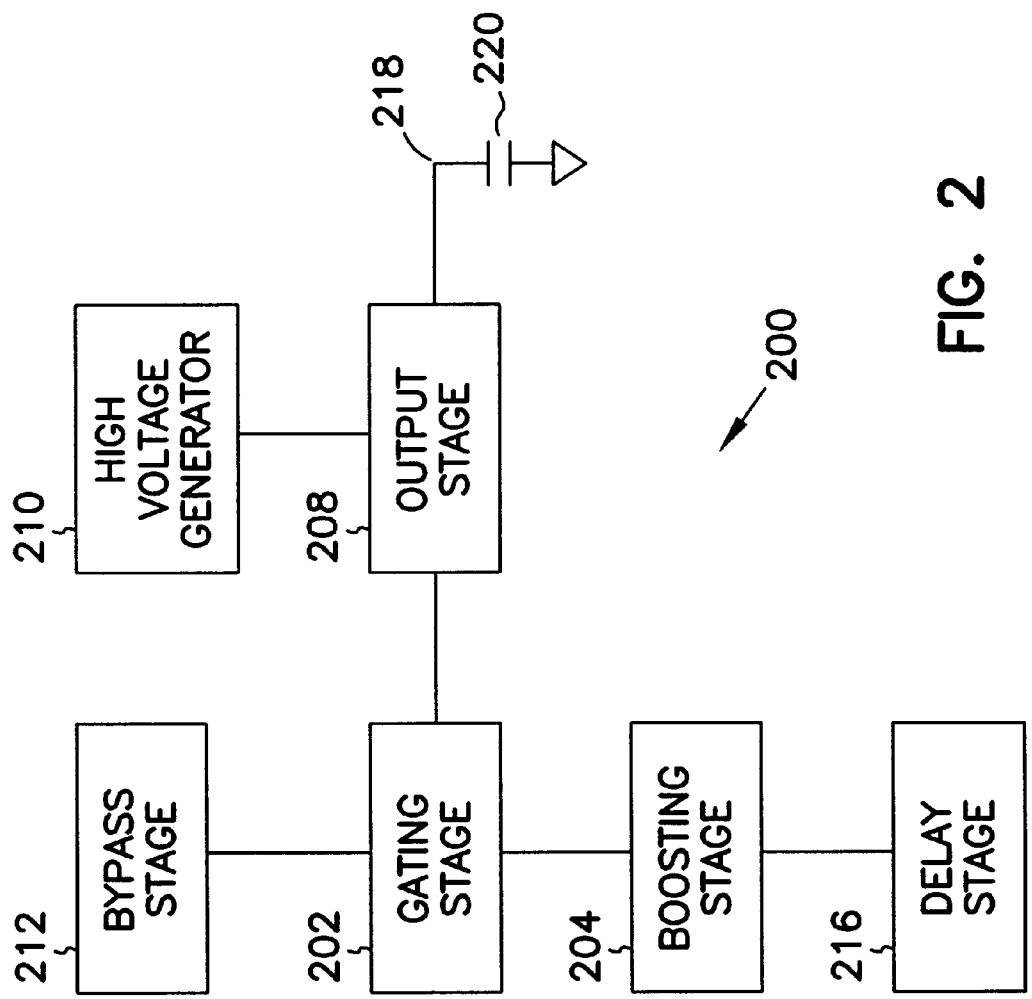
FIG. 2 is a block diagram illustrating a charge pump circuit according to one embodiment of the present invention.

FIG. 2 is a block diagram illustrating a charge pump circuit according to one embodiment of the present invention. The charge pump circuit 200 includes a gating stage 202. The gating stage 202 generates a gating signal to control an output stage 208.

The output stage 208 is receptive to at least one high-voltage signal from a high-voltage generator 210. In one embodiment, at node 218, an output load, such as the capacitor 220, may be placed upon the node 218 and ground. However, in other embodiments, linear, non-linear, or a combination of linear and non-linear elements may be placed upon the node 218 to function as an output load.

The gating stage 202 also includes a boosting stage 204. The boosting stage 204 boosts the gating signal to a predetermined voltage level. In one embodiment, once the boosting stage 204 boosts the gating signal to the predetermined voltage level, the output stage 208 may output the high-voltage signal without any degradation. The term degradation means the inclusion of level degradation associated with a slight reduction in the level of the high-voltage signal due to the threshold voltage associated with n-channel transistors.

The boosting stage 204 includes a delay stage 216. The delay stage 216 assists the boosting stage 204 to boost the gating signal to the predetermined voltage level. In one embodiment, such delay may be greater than about four nanoseconds depending on the configuration of the charge pump circuit 200. In another embodiment, such delay may be less than about four nanoseconds depending on the configuration of the charge pump circuit 200.

The charge pump circuit 200 also includes a bypass stage 212. In one embodiment, the bypass stage 212 selectively acts upon the gating stage 202 to bypass the ability of the gating stage 202 to present a certain level of the gating signal. In another embodiment, the bypass stage 212 selectively acts upon the boosting stage 204 to bypass the ability of the boosting stage 204 to boost the gating signal. In yet another embodiment, the bypass stage 212 selective acts upon the delay stage 216 to bypass the ability of the delay stage 216 to assist the boosting stage to boost the gating signal. In all embodiments, the output stage 208 presents a desired output voltage signal that would inhibit damage to circuitry or semiconductor breakdown due to the selective acts of the bypass stage 212.

Figure 3:
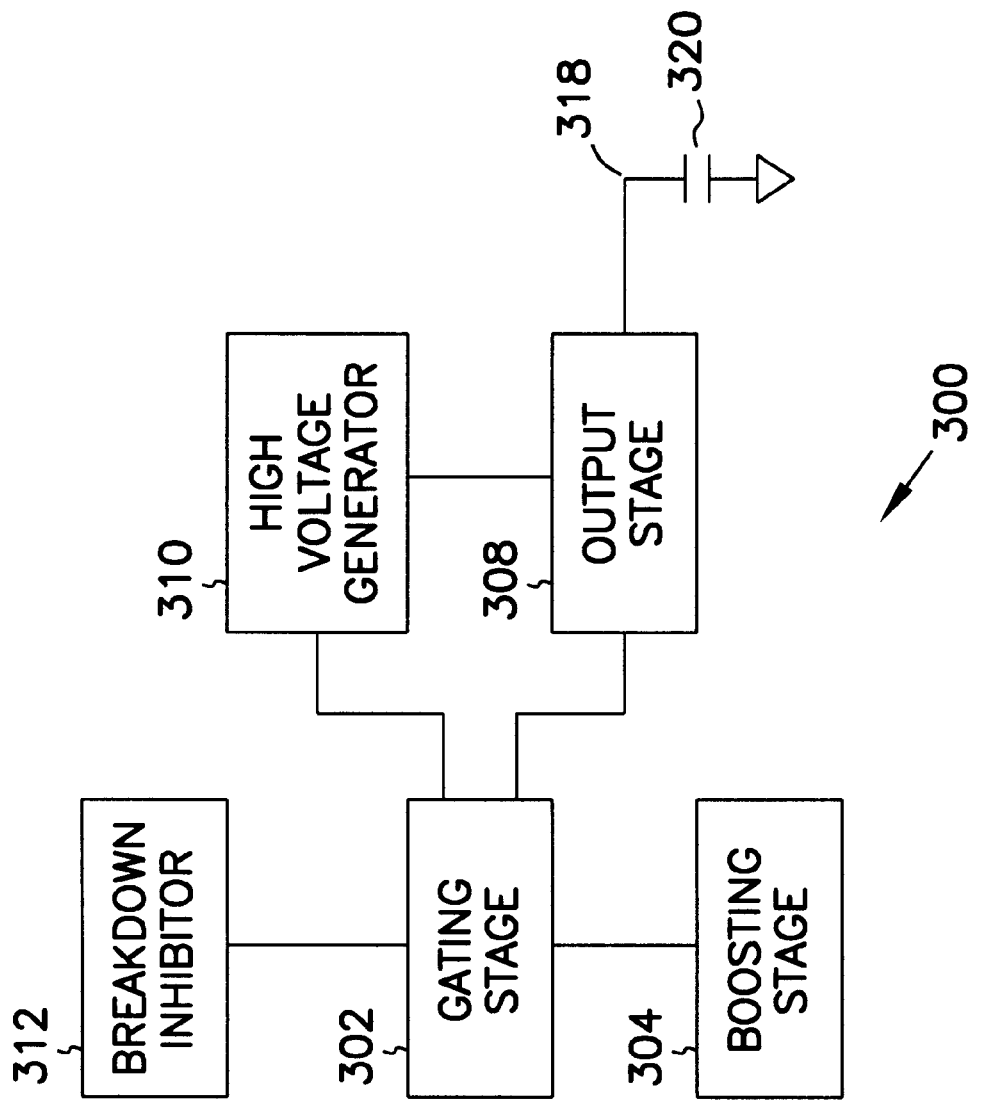
FIG. 3 is a block diagram illustrating a charge pump circuit according to one embodiment of the present invention.

FIG. 3 is a block diagram illustrating a charge pump circuit according to one embodiment of the present invention. FIG. 3 contains elements similar to those described in FIG. 2. The above descriptions of similar elements are incorporated here in full. The charge pump circuit 300 includes a breakdown inhibitor 312. The breakdown inhibitor 312 inhibits semiconductor breakdown in the charge pump circuit 300.

Semiconductor breakdowns in the charge pump circuit 300 include breakdowns of gate oxide and breakdowns of source-drain junction. Gate oxide is the framework that allows an electric field to be created inside a transistor to render the flow of current controllable. Gate oxide is typically grown over the substrate of the transistor. This gate oxide layer is essentially insulated from the rest of the transistor. This construction gives transistors that use gate oxide technology an extremely high gate-input resistance. The dimensions, width and length, of the gate oxide are considered to be important because these dimensions define the active channel of the transistor. When the charge pump circuit builds up from a high external supply an even higher output voltage, the gate oxide may break down. Such breakdown collapses the framework or the active channel that allows the electric field to be formed in the transistor, and thus, renders the transistor unusable.

The breakdown of the source-drain junction affects the voltage-current characteristics of a transistor. In the physics of the formation of the source-drain junction, a diode can be assumed to model the behavior of the source-drain junction. This diode can be controlled to operate the transistor in at least two well-known states: forward-bias and reverse-bias. When the charge pump circuit builds up from a high external supply an even higher output voltage, the source-drain junction may temporarily break down. In other words, the assumed diode may temporarily break down to behave more like a short circuit rather than maintain the characteristics of a diode.

Returning to the charge pump circuit 300, the breakdown inhibitor 312 senses when a high voltage level may cause semiconductor breakdowns in the charge pump circuit 300. When the breakdown inhibitor 312 senses such a high voltage level, in one embodiment, it selectively acts upon the gating stage 302 so that the gating stage 302 may provide a gating signal at a predetermined level to the output stage 308. In response to such a gating signal, the output stage 308 outputs a voltage level less than the input voltage received from the high-voltage generator 310.

Figure 4:
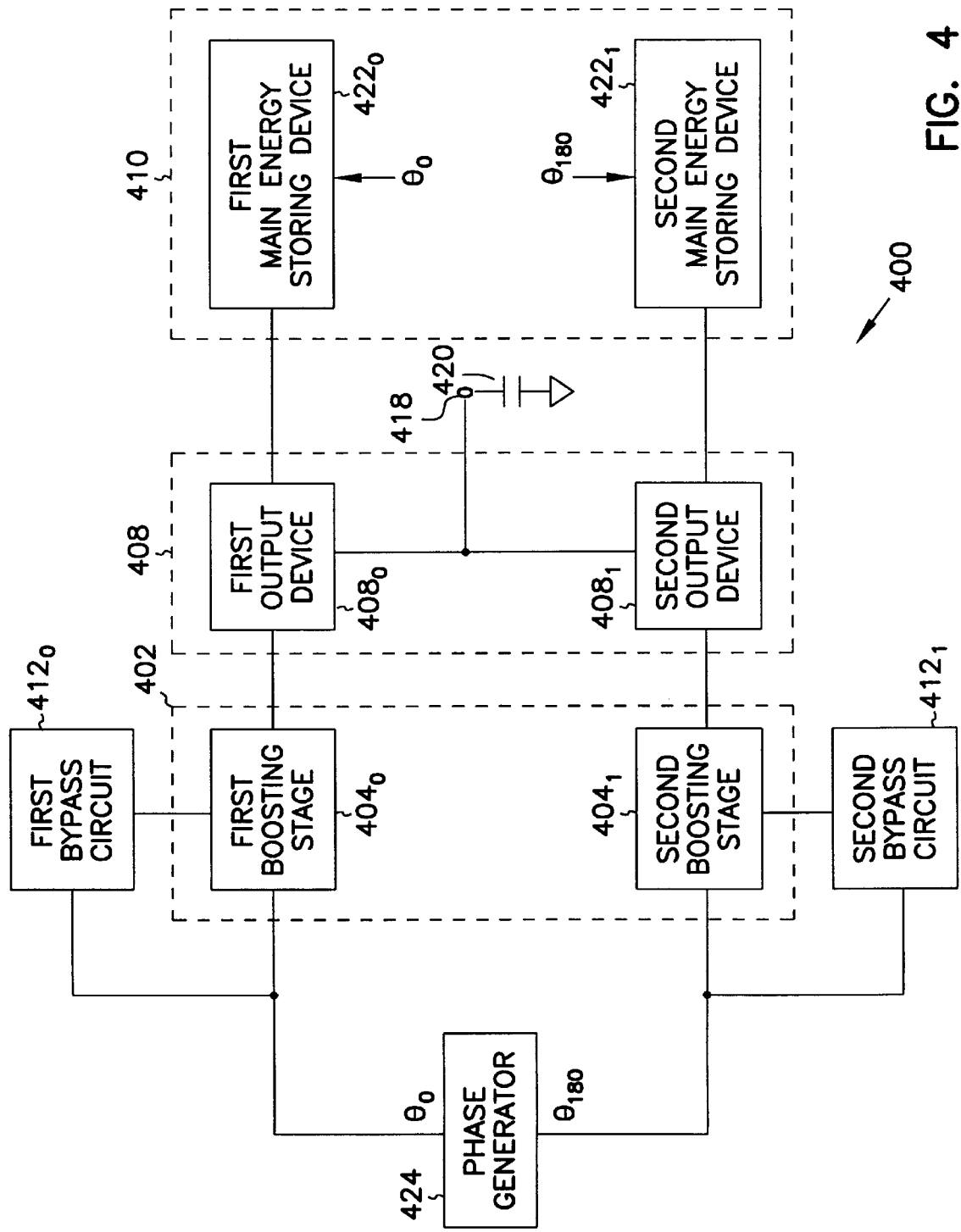
FIG. 4 is a block diagram illustrating a charge pump circuit according to one embodiment of the present invention.

FIG. 4 is a block diagram illustrating a charge pump circuit according to one embodiment of the present invention. A charge pump circuit 400 includes stages, circuits, and devices that will be described herein. In one embodiment, the charge pump circuit 400 includes two parallel sets of stages, circuits, or devices. In one embodiment, while one set of the stages, circuits, or devices will be discharging to provide a desired level of high-voltage output, the other set of stages, circuits, or devices will be charging up. Once the one set of the stages, circuits, or devices discharges, the other set will then discharge. Hence, the charge pump circuit 400 "pumps" charges so as to maintain the desired level of high-voltage output.

The charge pump circuit 400 includes a phase generator 424. The phase generator 424 generates two signals, $\phi_0$ and $\phi_{180}$, that can be interpreted as out of phase with respect to each other by about 180 degrees. These signals enable the charge pump circuit 400 to alternatively activate a set of stages, circuits, or devices to pump charges. In one embodiment, these two signals can be at logic level 0 or 1. In another embodiment, these two signals may not have the same logic level for a certain period of time for stable circuit operation.

The generated signal $\phi_0$ is presented to a first set of stages, circuits, or devices. Specifically, the generated signal $\phi_0$ is presented to a first boosting stage $404_0$ of a gating stage 402, a first bypass circuit $412_0$, and a first main energy-storing device of a high-voltage generator 410. The first boosting stage $404_0$ boosts a gating signal to a predetermined level and presents this gating signal to a first output device $408_0$ of an output stage 408. This boosted gating signal allows the first output device $408_0$ to present a high-voltage signal provided by the first main energystoring device $422_0$ of the high-voltage generator 410 at node 418. A load 420 is placed across the node 418.

The generated signal $\phi_{180}$ is presented to a second set of stages, circuits, or devices. Specifically, the generated signal $\phi_{180}$ is presented to a second boosting stage $404_1$ of the gating stage 402, a second bypass circuit $412_1$, and a second main energy-storing device of the high-voltage generator 410. The second boosting stage $404_1$ boosts another gating signal to a predetermined level and presents this gating signal to a second output device $408_1$ of the output stage 408. This boosted gating signal allows the second output device $408_1$ to present another high-voltage signal provided by the second main energy-storing device $422_1$ of the high-voltage generator 410 at node 418.

As described heretofore, only one of the signals $\phi_0$ and $\phi_{180}$ is at a level that would activate one set of stages, circuits, or devices. For example, while $\phi_0$ is at a logic level 1, the first set of stages, circuits, or devices will be discharging to output a high-voltage signal to node 418; $\phi_{180}$ will be at a logic level 0 and the second set of stages, circuits, or devices will be charging up. The next time period, $\phi_{180}$ will be at a logic level 1 and the second set of stages, circuits, or devices will now be discharging to maintain the high-voltage signal at node 418; during this time period, $\phi_0$ will be at a logic level 0 and the first set of stages, circuits, or devices will be charging up. This process continues the outputting of the high-voltage signal at node 418.

However, if either the first bypass circuit $412_0$ or the second bypass circuit $412_1$ senses that the output high-voltage signal at node 418 will be at an undesired level, either the first bypass circuit $412_0$ or the second bypass circuit $412_1$ may selectively bypass the boosting of the gating signal in the activated set of stages, circuits, or devices so as to inhibit the undesired high-voltage signal from being presented at node 418. In one embodiment, either the first bypass circuit $412_0$ or the second bypass circuit $412_1$ forces the gating signal to be presented to the output stage 408 contemporaneously with the presentation of the high-voltage signal from the high-voltage generator 410; in this embodiment, since the gating signal did not have time to be boosted, the output stage 408 presents a desired level of the high-voltage signal.

Figure 5A:
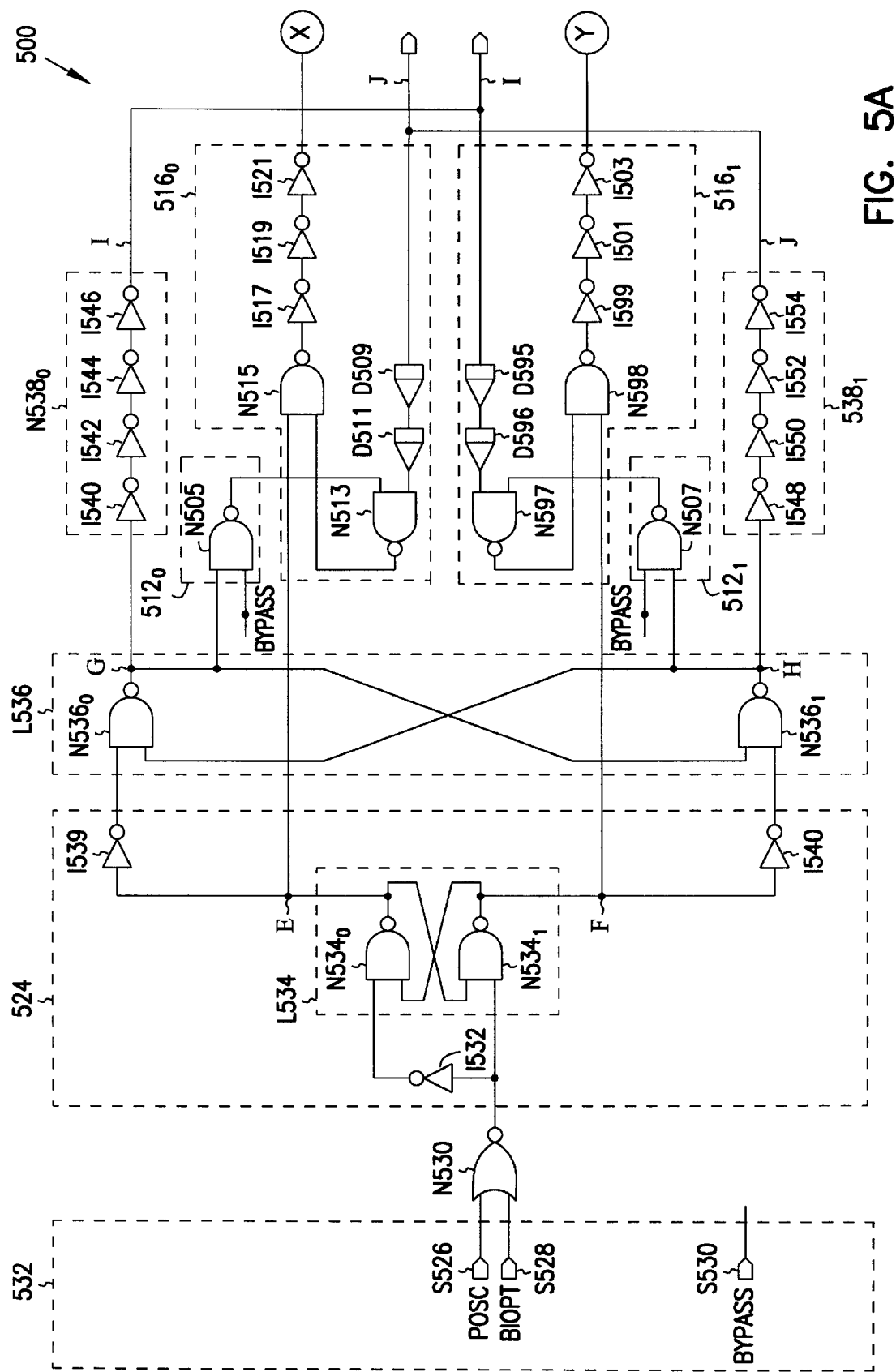
FIGS. 5A–5B are two parts of a circuit diagram illustrating a charge pump circuit according to one embodiment of the present invention.
Figure 5B:
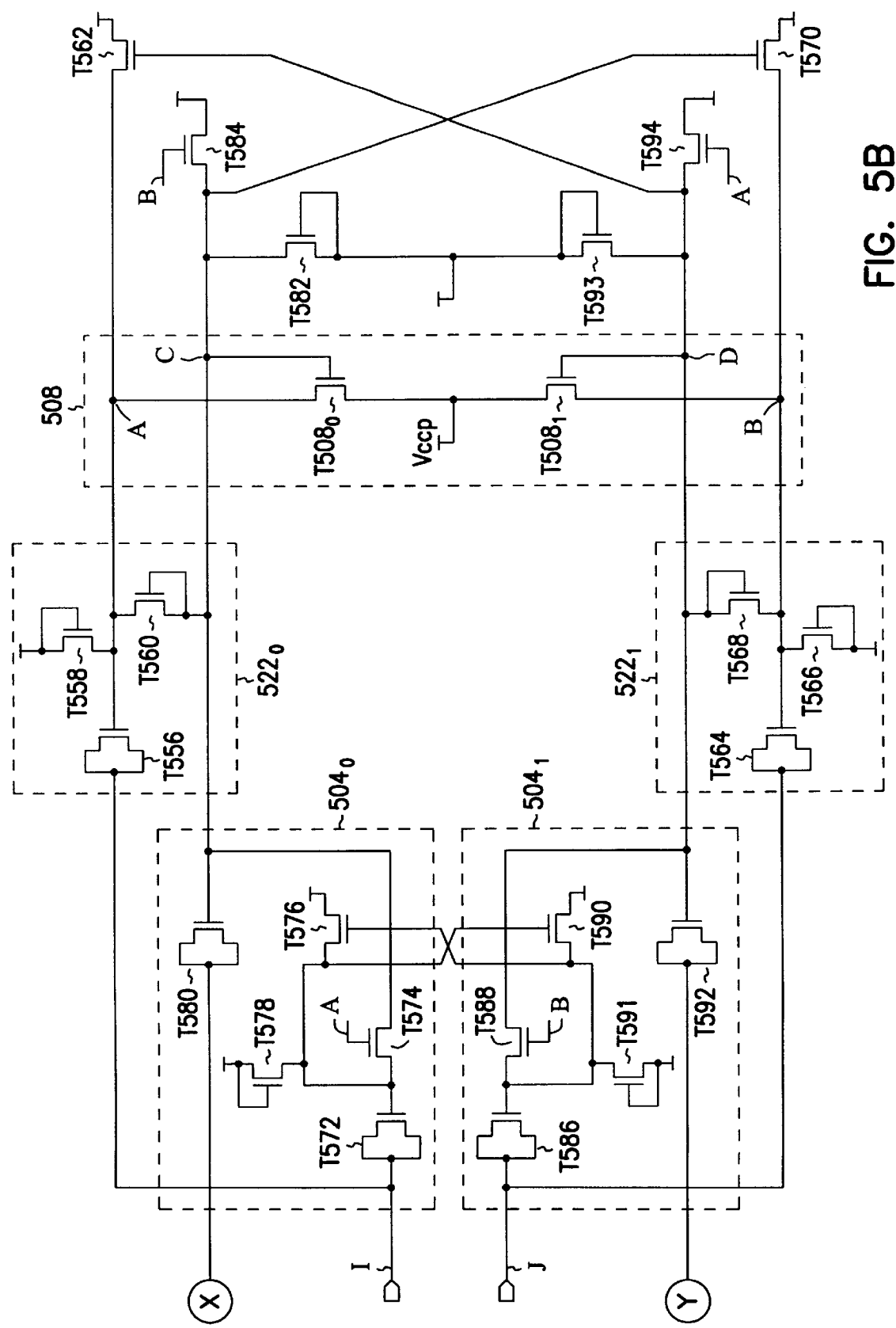

FIGS. 5A–5B are two parts of a circuit diagram illustrating a charge pump circuit according to one embodiment of the present invention. The charge pump circuit 500 includes a signal interface 532. The signal interface 532 is receptive of the POSC signal S526, the BIOPT signal S528, and the BYPASS signal S530. In one embodiment, the signal interface 532 is composed of input pins in an integrated circuit (not shown) that includes the charge pump circuit 500.

The POSC signal S526 provides timing to the charge pump circuit 500. The POSC signal S526 is a symmetrical signal with a predetermined period that is generated from an external oscillator circuit (not shown). The BIOPT signal S528 controls whether the charge pump circuit 500 is to pump charges. When the BIOPT signal S528 is at a high level, the charge pump circuit is disengaged from pumping charges. When the BIOPT signal S528 is at a low level, the charge pump circuit is engaged in pumping charges. The BYPASS signal S530 controls whether a gating signal would be boosted to enable the outputting of a full high-voltage signal at the output stage. How the BYPASS signal S530 controls the boosting of the gating signal will be discussed herein.

The output of the NOR gate N530 is input into a phase generator 524. The purpose of the phase generator 524 is to drive two parallel circuits of the charge pump circuit 500. When one of these two parallel circuits is producing a pumped high voltage level, the other is charging up. The phase generator 524 alternatively drives these two parallel circuits.

For illustrative purposes only, suppose the output signal of the NOR gate N530 is at a high level. This signal of the NOR gate N530 is input into an inverter I532 and a NAND gate N534$_1$ of an SR latch L534. The inverter I532 inverts the high-level signal and presents a low-level signal to the NAND gate N534$_0$ of the SR latch L534. The NAND gate N534$_0$ of the SR latch L534 in response to the low-level signal produces a high-level signal at node E. Correspondingly, the NAND gate N534$_1$ of the SR latch L534 produces a low-level signal at node F.

Returning to node E, the high-level signal at node E is presented to an inverter I539. The inverter I539 inverts the high-level signal and presents a low-level signal to a NAND gate N536$_0$ of an SR latch L536. The NAND gate N536$_0$ of the SR latch L536 in response to the low-level signal produces a high-level signal at node G. The high-level signal at node E is also presented to a delay stage 516$_0$. The delay stage 516$_0$ will be discussed below Returning to node F, the low-level signal at node F is presented to an inverter I540. The inverter I540 inverts the low-level signal at node F and presents a high-level signal to a NAND gate N536$_1$ of the SR latch L536. The NAND gate N536$_1$ of the SR latch L536 produces a low-level signal at node H. The low-level signal at node F is also presented to a delay stage 516$_1$. The delay stage 516$_1$ will be discussed below.

Therefore, nodes E, F, G, and H are output nodes of the phase generator 524.

Returning to node G, the high-level signal at node G is input into a driver stage 538$_0$. The driver stage 538$_0$ includes a series of cascading inverters I540, I542, I544, and I546. The purpose of these inverters is to drive the input signal from node G to ensure that there are adequate edge rates. This input signal may need to maintain a certain integrity when it is passed on to subsequent stages of the charge pump circuit 500. The term "drive" is understood to mean the inclusion of maintaining an acceptable level of rise and fall times of an alternating signal. In one embodiment, to drive a signal with the desired characteristics at the output of the inverter I546, each succeeding inverter of the driver stage 538$_0$ is at a predetermined size. In one embodiment, each succeeding inverter of the driver stage 538$_0$ is larger than the last inverter.

The driver stage 538$_0$ reproduces a high-level signal at node I. The foregoing discussion regarding the driver stage 538$_0$ is also applicable to the driver stage 538$_1$. Therefore, the above discussion is incorporated here in full to describe the driver stage 538$_1$. Since a low-level signal is input into the driver stage 538$_1$, the driver stage 538$_1$ reproduces a low-level signal at node J.

Returning to node G, the high-level signal at node G is presented to a bypass stage 512$_0$. In one embodiment, the bypass stage includes a NAND gate N505. One input into the NAND gate N505 includes the signal from node G, and the other input signal is from the BYPASS signal S530. For illustrative purposes, suppose the BYPASS signal S530 is at a low level. Since one of the input signals into the NAND gate N505 is low, the output of the NAND gate N505 is high. This high-level signal is presented to the delay stage 516$_0$, which will be described below.

Returning to node H, the low-level signal at node H is presented to a bypass stage 512$_1$. In one embodiment, the bypass stage includes a NAND gate N507. One input into the NAND gate N507 includes the signal from node H, and the other input signal is from the BYPASS signal S530. For illustrative purposes, suppose the BYPASS signal S530 is at a low level. Since one of the input signals into the NAND gate N507 is low, the output of the NAND gate N507 is high. This high-level signal is presented to a delay stage 516$_1$, which will be described below.

Returning to node I, the high-level signal at node I is presented to a high-voltage generator 522$_0$. Specifically, the high-level signal is presented to an energy-storing device T556 of the high-voltage generator 522$_0$. The energy-storing device T556 has been pre-charged by a pre-charging device T558 to a level near the external supply. The energy-storing device T556 has also been charged up to the level of the external supply by the charging device T562. The gate of the charging device T562 is receptive to the charges from the previous phase of the charge pump circuit 500. Because the control of the gate of the charging device T562 does not limit the present invention, it is not presented in full detail here.

The high-voltage generator 522$_0$ also includes a coupling device T560. The purpose of the coupling device T560 is to couple the high-voltage generator 522$_0$ and a boosting stage of the charge pump circuit 500, which will be discussed herein. In one embodiment, the coupling device T560 is a square-law device, such as a diode. In another embodiment, the coupling device T560 is a transistor; the drain of the transistor is connected to the gate of the transistor; the drain of the transistor is coupled to the boosting stage; the source is connected to one of the plates of the energy-storing device T556.

The foregoing discussion regarding high-voltage generator 522$_0$ is applicable to a high-voltage generator 522$_1$ since these high-voltage generators have similar elements. Therefore, the above discussion is incorporated here in full to describe the high-voltage generator 522$_1$. Specifically, the high-voltage generator 522$_1$ includes an energy-storing device T564, a pre-charging device T566, a charging device T570, and a coupling device T568.

Returning to the high-level signal at node I, this high-level signal at node I is presented to the energy-storing device T556. The energy-storing device T556 has been charged up to the level of the external supply Vcc by the charging device T562. When the high-level signal at node I is presented to the energy-storing device T556, the energy-storing device T556 will be charged up from the voltage level Vcc to a higher voltage level above Vcc (hereinafter, 2Vcc). In one embodiment, the term "2Vcc" means the inclusion of a voltage level that is nearly twice the voltage level Vcc. In another embodiment, the term "2Vcc" means the inclusion of a voltage level that is precisely twice the voltage level Vcc. Hence, the energy-storing device T556 stores an amount of charges that generates a 2Vcc voltage level. The 2Vcc voltage level is presented at node A.

This 2Vcc voltage level at node A is presented to an output stage 508. Specifically, the 2Vcc voltage level is presented to a drain of a transistor $T508_0$. As will be discussed herein, since the transistor $T508_0$ is not yet conducting current, the charges stored in the energy-storing device T556 are maintained, and the 2Vcc voltage level continues to be presented at node A. The reason the transistor $T508_0$ is not conducting current is that the charges provided at node C are not sufficient to forward-bias the transistor $T508_0$.

In one embodiment, the output stage 508 comprises at least one output device. This output device includes a first, a second, and a third connection. In another embodiment, the output stage 508 comprises at least one transistor. This transistor includes a gate, a drain, and a source. The foregoing discussion regarding the transistor $T508_0$ is applicable to a transistor $T508_1$ since these transistors have similar finctionality. Therefore, the above discussion is incorporated here in full to describe the transistor $508_1$.

Returning to node I, the high-level signal is also presented to a boosting stage $504_0$. Specifically, the high-level signal is provided to an energy-storing device T572 of the boosting stage $504_0$. The energy-storing device T572 has been pre-charged by a pre-charging device T578 to a level near that of the external supply. The energy-storing device T572 has also been charged up to the level of the external supply by the charging device T576. The gate of the charging device T576 is receptive to the charges from the previous phase of the charge pump circuit 500. Because the control of the gate of the charging device T576 does not limit the present invention, it is not presented in full detail here.

Returning to node I, when the high-level signal is presented to the energy-storing device T572, the energy-storing device T572 will be charged up from the voltage level Vcc to 2Vcc. Hence, the energy-storing device T572 stores an amount of charges that generates a 2Vcc voltage level.

The boosting stage $504_0$ includes a charge-transfer device T574. In one embodiment, the charge-transfer device T574 is a transistor with its drain connected to the energy-storing device T572, its gate connected to node A, and its source connected to an energy-storing device T580 of the boosting stage $504_0$. As previously discussed, the voltage at node A is at a 2Vcc voltage level. At this voltage level at the gate, the charge-transfer device T574 is forward-biased and allows charges to flow from the energy-storing device T572 to the energy-storing device T580.

The energy-storing device T580 has been pre-charged by a pre-charging device T582 to a level near the external supply. The energy-storing device T580 has also been charged up to the level of the external supply Vcc by the charging device T584. The gate of the charging device T584 is receptive to the charges from the previous phase of the charge pump circuit 500. Because the control of the gate of the charging device T584 does not limit the present invention, it is not presented in full detail here.

When charges flow from the energy-storing device T572 to the energy-storing device T580, the energy-storing device T580 stores this additional amount of charges. In one embodiment, this additional amount of charges plus the stored charges generate a slightly higher voltage level than Vcc at node C. In one embodiment, this higher voltage level is the sum of Vcc and Vt (hereinafter, Vcc+Vt). Vt is the threshold voltage of a transistor that when applied at the proper polarity will transition the transistor into a forward-biased state.

The charges in the energy-storing device T580 flow to node C wherein the charges are presented to the output stage 508. Specifically, the charges are presented to a gate of the transistor $T508_0$. This amount of charges from the energy-storing device T580 is not sufficient to forward-bias the transistor $T508_0$.

The foregoing discussion regarding the boosting stage $504_0$ is applicable to a boosting stage $504_1$ since these boosting stages have similar elements. Therefore, the above discussion is incorporated here in full to describe the boosting stage $504_1$. Specifically, the boosting stage $504_1$ includes an energy-storing device T586, a pre-charging device T591, a charging device T590, a charge-transfer device T588, an energy-storing device T592, a pre-charging device T593, and a charging device T594.

Returning to node I, the high-level signal at node I is presented to the delay stage $516_1$. Specifically, the high-level signal is presented to two delay devices, D595 and D596. These delay devices serve to delay the boosting of the energy-storing device T592. Such delay allows the energy-storing device T592 to receive additional charges flowing from the energy-storing device T586 through the charge-transfer device T588. In one embodiment, each delay device delays a signal by about two nanoseconds.

The delayed high-level signal is presented to the NAND gate N597. The other input signal to the NAND gate N597 is from the bypass stage $512_1$, specifically from NAND gate N507. As discussed above, this signal from NAND gate N507 is a high-level signal. Since both inputs to the NAND gate N597 are both at a high level, the output of the NAND gate N597 is low.

This low-level signal is presented to a NAND gate N598. The other input signal into the NAND gate N598 is from node F. As discussed above, this signal is at a low level. Because one of the input signals into the NAND gate N598 is a low-level signal, the output of the NAND gate N598 is a high-level signal.

This high-level signal is presented to a series of cascaded inverters, I599, I501, and I503. These series of cascaded inverters help to drive an input signal toward the energy-storing device T592. Because a high-level signal is presented to this series of cascaded inverters, the inverters present a low-level signal to the energy-storing device T592.

In one embodiment, this low-level signal is insufficient to charge the energy-storing device T592 to a predetermined quantity of charges that may be needed to output a high-voltage signal at output transistor $T508_1$. Because the energy-storing device T592 is not charged up to the predetermined quantity, an insufficient level of charges will flow from the energy-storing device T592 to the gate of the output transistor $T508_1$. The transistor $T508_1$ therefore is not forward-biased to output any voltage signal for this particular phase.

Returning to node J, the low-level signal at node J is presented to the energy-storing device T564. This low-level signal is insufficient to charge the energy-storing device T564 to a level of charges sufficient to provide a pumped high-voltage level. The low-level signal at node J is also presented to the energy-storing device T586. The low-level signal is also insufficient to charge the energy-storing device T586 to a level of charges to boost the charges at the energy-storing device T592.

Therefore, when a low-level signal is presented by the phase generator 524 at either node F or node J, the energy-storing devices T586 and T592 of the boosting stage and the energy-storing device T564 of the high-voltage generator $T522_1$ will not output a high-voltage signal through the output transistor $T508_1$ of the output stage 508.

Returning to node J, the low-level signal at node J is presented to the delay stage $516_0$. Specifically, the low-level signal is presented to two delay devices, D509 and D511. These delay devices serve to delay the boosting of the energy-storing device T580. Such delay allows the energy-storing device T580 to receive additional charges flowing from the energy-storing device T572 through the transfer charge device T574. In one embodiment, each delay device delays a signal by about two nanoseconds.

The delayed low-level signal is presented to the NAND gate N513. The other input signal to the NAND gate N513 is from the bypass stage $512_0$, specifically from NAND gate N505. As discussed above, one input into the NAND gate N505 includes the high-level signal from node G, and the other input signal is from the BYPASS signal S530. For illustrative purposes, suppose the BYPASS signal S530 is at a low level. Since one of the input signals into the NAND gate N505 is low, the output of the NAND gate N505 is high. This high-level signal is presented to the NAND gate N513 of the delay stage $516_0$. Because one of the inputs to the NAND gate N513 is at a low level, the output of the NAND gate N513 is high.

This high-level signal is presented to a NAND gate N515. The other input signal into the NAND gate N515 is from node E. As discussed above, this signal is a high-level signal. Because both input signals into the NAND gate N598 are at a high level, the output of the NAND gate N515 is a low-level signal.

This low-level signal is presented to a series of cascaded inverters, 1517, 1519, and 1521. This series of cascaded inverters help to drive an input signal toward the energy-storing device T580. Because a low-level signal is presented to this series of cascaded inverters, the inverters present a high-level signal to the energy-storing device T580.

In one embodiment, this high-level signal is sufficient to substantially charge the energy-storing device T580 to a predetermined quantity of charges so as to provide for a voltage level of 2Vcc+Vt at node C. These charges flow from the energy-storing device T580 to the gate of the output transistor $T508_0$. This amount of charges allows the transistor $T508_0$ to fully output a high-voltage signal without degradation, such as from a threshold voltage drop. The transistor $T508_0$ therefore is forward-biased to conduct current from its drain to the output node Vccp. In one embodiment, an output load (not shown) is connected between the output node Vccp and ground.

Because the output transistor $T508_0$ is conducting current, the charges in the energy storing device T556 flow away from the energy-storing device T556 to node A. Additionally, charges from energy-storing device T572 will flow to node C. Then, a portion of these charges and the charges of T580 will flow through the coupling device T560 to join the charges at node A. At node A, the charges flow through the drain and the source of the output transistor $T508_0$. Then the charges flow toward the output node Vccp. At the output node Vccp, the charges flow through the output load, and discharge to ground. In one embodiment, this amount of charges allows a 2Vcc voltage to be presented at the output node Vccp.

If the external supply Vcc is already at a high voltage level, the voltage presented at the output node Vccp may be at an even greater voltage level. As discussed heretofore, this greater voltage level may damage the charge pump circuit 500 or other circuits in the vicinity of the charge pump circuit 500.

In one embodiment, this greater voltage level can be controlled by either the bypass stage $512_0$ or the bypass stage $512_1$ depending on the phase generated by the phase generator 524. The term control is understood to mean the inclusion of diminishing the greater voltage level to a level that will not damage the charge pump circuit or other circuits. In one embodiment, this control can be accomplished by inhibiting the energy-storing device T580 from boosting up from the additional charges flowing from the energy-storing device T572, or inhibiting the energy-storing device T592 from boosting up from the additional charges flowing from the energy-storing device T586, depending on the phase generated by the phase generator 524.

Such control can also be accomplished by providing a BYPASS signal S530. For illustrative purposes only, suppose the BYPASS signal S530 is at a high level. The NAND gate N505 of the bypass stage $512_0$ receives the signal at node G which is high and the BYPASS signal S530 which is also high. Because both the input signals are high, the NAND gate N505 outputs a low-level signal.

This low-level signal is input into the NAND gate N513 of the delay stage $516_0$. As discussed above, the other input signal into the NAND gate N513 is a delayed low-level signal. However, this delayed low-level signal is considered to be a don't care signal because the signal from the NAND gate N505 is at a low level. The NAND gate N513 outputs a high-level signal irrespective of the level of signal from the delay devices D511 and D509. Thus, the delay devices D511 and D509 are essentially bypassed by the bypass phase $512_0$.

The high-level signal from the NAND gate N513 is presented to the NAND gate N515. The other input signal, as previously discussed, from node E is also at a high level. Therefore, the NAND gate N515 outputs a low-level signal. This low-level signal is driven by the inverters, 1517, 1519, and 1521 toward the energy-storing device T580. The low-level signal is inverted by 1521 to a high-level signal. This high-level signal is presented to the energy-storing device T580.

The high-level signal boosts the charges stored in the energy-storing device T580 to a predetermined level that will impose a 2Vcc voltage level at node C. Because the delay devices D511 and D509 were bypassed by the bypass stage $512_0$, the charges in the energy-storing device T572 may not have an opportunity to additionally boost the charges in the energy-storing device T580. The charges from T580 flow toward the gate of the output transistor $T580_0$. This amount of charges is sufficient to output a high voltage level but not as high as it would have been had the energy-storing device T572 had an opportunity to boost the energy-storing device T580.

The foregoing discussion is applicable to the bypass stage $512_1$, the delay stage $516_1$, the boosting stage $504_1$, the high-voltage generator $522_1$, and the output transistor $T508_1$ when the phase generator 524 generates a phase that would activate these stages, devices, and circuits to output a high-voltage signal.

Figure 6:
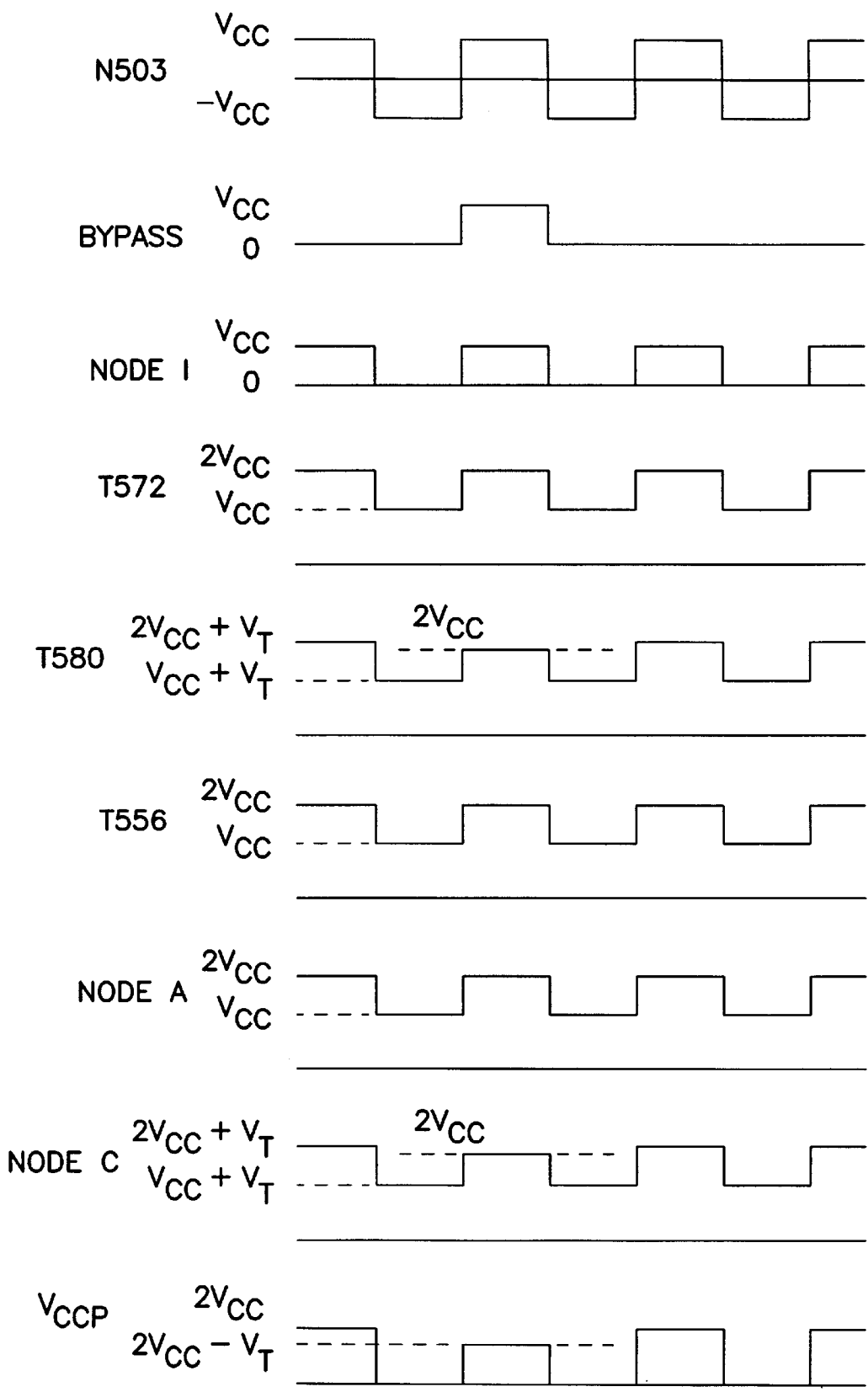
FIG. 6 is a timing diagram illustrating a charge pump circuit according to one embodiment of the present invention.

FIG. 6 is a timing diagram illustrating a charge pump circuit according to one embodiment of the present invention. FIG. 6 shows the timings for a portion of a charge pump circuit as discussed in FIGS. 5A–5B. Circuit elements of FIGS. 5A–5B that are similar to those whose timings are show in FIG. 6 have similar timings also.

CONCLUSION

Devices and methods have been described to output a high-voltage signal in a charge pump circuit. The embodiments as described allow a high-voltage signal to be output from a charge pump circuit without level degradation. In cases where the charge pump circuit may generate a high-voltage signal at a level that may damage circuitry of the charge pump circuit or other circuits in the vicinity of the charge pump circuit, a bypass process is initiated to inhibit such a high-voltage signal from being output.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A charge pump circuit, comprising:
    a gating stage to generate a gating signal, wherein the gating stage includes at least one boosting stage to boost the gating signal to a predetermined level of energy;
    a high-voltage generator to generate a high-voltage signal, wherein the high-voltage generator includes:
        a main energy storing transistor having a gate, a source, and a drain, wherein the gate of the main energy storing transistor is coupled to the gating stage, and wherein the source of the main energy storing transistor is coupled to the drain of the main energy storing transistor; and
        a coupling transistor having a gate, a source, and a drain to couple the main energy storing transistor to the gating stage, wherein the gate of the coupling transistor is connected to the drain of the coupling transistor, wherein the source of the coupling transistor is connected to the gate of the main energy storing transistor, and wherein the drain of the coupling transistor is connected to the at least one boosting stage of the gating stage;
        an output stage having a first, a second, and a third connection, wherein the first connection of the output stage is receptive to the high-voltage signal generated by the high-voltage generator, wherein the second connection of the output stage is coupled to the gating stage to receive the gating signal, and wherein the third connection presents the high-voltage signal; and
    a bypassing stage coupled to the gating stage to selectively act upon the at least one boosting stage so as to allow the output stage to output a desired level of the high-voltage signal.

2. A charge pump circuit, comprising:
    a phase generator to generate a first and a second phase;
    a gating stage to generate a gating signal, wherein the gating stage includes a first and a second boosting stage to boost the gating signal to a predetermined level of energy;
    a high-voltage generator to provide a high-voltage signal, wherein the high-voltage generator includes a first and a second main energy-storing device;
    an output stage coupled to the gating stage, wherein the output stage receives and outputs the high-voltage signal, wherein the output stage includes a first and a second output device; and
    a bypass stage coupled to the gating stage to selectively act upon the gating stage so as to allow the output stage to output a desired level of the high-voltage signal, wherein the bypass stage includes a first and a second bypassing circuit.

3. A charge pump circuit, comprising:
    a phase generator to generate a phase and a complementary phase, wherein the phase is 180 degrees out of phase with respect to the complementary phase;
    a gating stage to generate a gating signal, wherein the gating stage includes a first and a second boosting stage to boost the gating signal to a predetermined level of energy;
    a high-voltage generator to provide a high-voltage signal, wherein the high-voltage generator includes a first and a second main energy-storing device;
    an output stage coupled to the gating stage, wherein the output stage receives and outputs the high-voltage signal, wherein the output stage includes a first and a second output device; and
    a bypass stage coupled to the gating stage to selectively act upon the gating stage so as to allow the output stage to output a desired level of the high-voltage signal, wherein the bypass stage includes a first and a second bypassing circuit.

4. A method of pumping charges, comprising:
    generating by a gating stage to generate a gating signal, wherein the gating stage includes at least one boosting stage to boost the gating signal to a predetermined level of energy, wherein the at least one boosting stage includes a delay stage to assist the at least one boosting stage to boost the gating signal to the predetermined level of energy;
    outputting by an output stage having a first, a second, and a third connection, wherein the first connection of the output stage is receptive to a high-voltage signal, wherein the second connection of the output stage is coupled to the gating stage to receive the gating signal, and wherein the third connection presents the high-voltage signal; and
    bypassing by a bypassing stage coupled to the gating stage to produce a bypass signal, wherein the bypass signal selectively acts upon the gating stage to bypass the delay stage.

5. A method of pumping charges, comprising:
    generating by a phase generator to generate a first and a second phase;
    generating by a gating stage to generate a gating signal, wherein the gating stage includes a first and a second boosting stage to boost the gating signal to a predetermined level of energy;

generating by a high-voltage generator to provide a high-voltage signal, wherein the high-voltage generator includes a first and a second main energy-storing device;

outputting by an output stage coupled to the gating stage to output the high-voltage signal, wherein the output stage is receptive to the high-voltage signal, wherein the output stage includes a first and a second output device; and bypassing by a bypass stage coupled to the gating stage to selectively act upon the gating stage so as to allow the output stage to output a desired level of the high-voltage signal, wherein the bypass stage includes a first and a second bypassing circuit.

6. A method of pumping charges, comprising:

generating by a phase generator to generate a phase and a complementary phase, wherein the phase is 180 degrees out of phase with respect to the complementary phase;

generating by a gating stage to generate a gating signal, wherein the gating stage includes a first and a second boosting stage to boost the gating signal to a predetermined level of energy;

generating by a high-voltage generator to provide a high-voltage signal, wherein the high-voltage generator includes a first and a second main energy-storing device;

outputting by an output stage coupled to the gating stage to output the high-voltage signal, wherein the output stage is receptive of the high-voltage signal, wherein the output stage includes a first and a second output device; and bypassing by a bypass stage coupled to the gating stage to selectively act upon the gating stage so as to allow the output stage to output a desired level of the high-voltage signal, wherein the bypass stage includes a first and a second bypassing circuit.

7. A two-phase charge pump, comprising:

a signal interface for receiving an oscillator signal and a bypass signal;

a phase generator connected for receiving the oscillator signal and producing therefrom a first phase signal and a second phase signal;

an S/R latch circuit connected for receiving the first phase signal and a second phase signal and producing therefrom a first gated S/R signal and a second gated S/R signal;

a first bypass circuit connected for receiving the first gated S/R signal and the bypass signal and operable for producing therefrom a first gated bypass signal;

a second bypass circuit connected for receiving the second gated S/R signal and the bypass signal and operable for producing therefrom a second gated bypass signal;

a first delay circuit connected for receiving the first gated bypass signal, the oscillator signal and the second S/R output signal and operable for producing therefrom a first gated delay signal;

a second delay circuit connected for receiving the second gated bypass signal, the oscillator signal and the first S/R output signal and operable for producing therefrom a second gated delay signal;

a first boost circuit connected for receiving the first delay signal and the first gated S/R signal, and operable for producing therefrom a first pre-charging signal;

a second boost circuit connected for receiving the second delay signal and the second gated S/R signal and operable for producing therefrom a second pre-charging signal;

a first high voltage generator circuit connected for receiving the first pre-charging signal and the first gated S/R signal and operable for producing therefrom a first high voltage signal;

a second high voltage generator circuit connected for receiving the pre-charging signal and the second gated S/R signal and operable for producing therefrom a second high voltage signal; and an output circuit operable for receiving the first pre-charging signal, the first high voltage signal, the second pre-charging signal and the second high voltage signal and producing therefrom a boosted output voltage.

8. A charge pump circuit, comprising:

an oscillator input for receiving an oscillator signal;

a bypass input for receiving a bypass signal;

an output transistor having a first connection, a second connection and a gate, the second connection operable for producing a boosted output voltage;

a first energy storage device having a first plate electrically coupled to the first connection of the output transistor, and a second plate electrically coupled to receive the oscillator signal;

a second energy storage device having a first plate electrically coupled to the gate of the output transistor;

a third energy storage device having first and second plates, the second plate electrically coupled to receive the oscillator signal;

a charge transfer transistor having a source connected to the gate of the output transistor, a drain connected to the first plate of the third energy storage device, and a gate connected to the first plate of the energy storage device;

a delay element having an output electrically connected to the second plate of the second energy storage device and having an input connected to the output of a bypass device; and the bypass device connected to receive the oscillator signal and the bypass signal and operable to pass or inhibit the oscillator signal in response to the bypass signal to either delay boosting the second energy storing device or inhibit boosting the second energy device.

9. The integrated circuit charge pump of claim 8 further comprising a plurality of pre-charge circuits for pre-charging the first, second or third energy storage devices to an external supply voltage level.

10. A two-phase charge pump for producing a boosted voltage on an output line, comprising:

an oscillator circuit for receiving an oscillator signal and producing therefrom a first phase signal and a second phase signal;

a bypass input for receiving a bypass signal;

a first-phase charge pump circuit having a first-phase output transistor having a first terminal, a second terminal and a gate, the second terminal connected to the output line and operable for producing a boosted output voltage on the output line, the first-phase charge pump circuit including:

a first-phase first energy storage device having a first plate electrically coupled to the first terminal of the first-phase output transistor, and a second plate electrically coupled to receive the first phase signal of the oscillator circuit;

a first-phase second energy storage device having a first plate electrically coupled to the gate of the output transistor;

a first-phase third energy storage device having a second plate electrically coupled to receive the first phase signal of the oscillator circuit;

a first-phase charge transfer transistor having a source connected to the gate of the first-phase output transistor, a drain connected to the first plate of the first-phase third energy storage device, and a gate connected to the first plate of the first-phase first energy storage device;

a first-phase delay element having an output electrically connected to the second plate of the first-phase second energy storage device and having an input connected to the output of a first-phase bypass device;

the first-phase bypass device connected to receive the second phase signal from the oscillator circuit, and connected to receive the bypass signal and operable to pass or inhibit the second phase signal in response to the bypass signal to either delay boosting the first-phase second energy storing device or inhibit boosting the first-phase second energy device;

a second-phase charge pump circuit having a second-phase output transistor having a first terminal, a second terminal and a gate, the second terminal operable connected to the output line and operable for producing a boosted output voltage on the output line, the second-phase charge pump circuit including:

a second-phase first energy storage device having a first plate electrically coupled to the first terminal of the second-phase output transistor, and a second plate electrically coupled to receive the second phase signal of the oscillator circuit;

a second-phase second energy storage device having a first plate electrically coupled to the gate of the output transistor;

a second-phase third energy storage device having a second plate electrically coupled to receive the second phase signal of the oscillator circuit;

a second-phase charge transfer transistor having a source connected to the gate of the second-phase output transistor, a drain connected to the first plate of the second-phase third energy storage device, and a gate connected to the first plate of the second-phase first energy storage device;

a second-phase delay element having an output electrically connected to the second plate of the second-phase second energy storage device and having an input connected to the output of a second-phase bypass device;

the second-phase bypass device connected to receive the first phase signal from the oscillator circuit, and connected to receive the bypass signal and operable to pass or inhibit the first phase signal in response to the bypass signal to either delay boosting the second-phase second energy storing device or inhibit boosting the second-phase second energy device.

11. The two-phase charge pump of claim 10 further comprising a plurality of pre-charge circuits for pre-charging the first, second or third energy storage devices to an external supply voltage level.

* * * * *

UNITED STATES PATENT AND TRADEMARK OFFICE
CERTIFICATE OF CORRECTION

PATENT NO.   : 6,285,243 B1
DATED        : September 4, 2001
INVENTOR(S)  : Richard A. Mecier and Todd A. Merritt It is certified that error appears in the above-identified patent and that said Letters Patent is hereby corrected as shown below:

Column 6,
Lines 30 and 33, delete "404" and insert -- 404$_1$ --, therefor.
Line 54, delete "412" and insert -- 412$_1$ --, therefor.

Column 7,
Line 52, delete "N536" and insert -- N536$_1$ --, therefor.

Column 9,
Line 31, delete "finctionality" and insert -- functionality --, therefor.

Column 11,
Line 44, delete "1517, 1519, and 1521" and insert -- I517, I519, and I521 --, therefor.

Column 12,
Lines 47-48, delete "1517, 1519, and 1521" and insert -- I517, I519, and I521 --, therefor.
Line 49, delete "1521" and insert -- I521 --, therefor.

Signed and Sealed this

Fourth Day of June, 2002

Attest:

*Attesting Officer*

JAMES E. ROGAN
*Director of the United States Patent and Trademark Office*